March 19, 1968        E. SPIRE        3,373,986
METALLURGICAL VESSEL WITH SAFETY DEVICE
Filed June 11, 1965
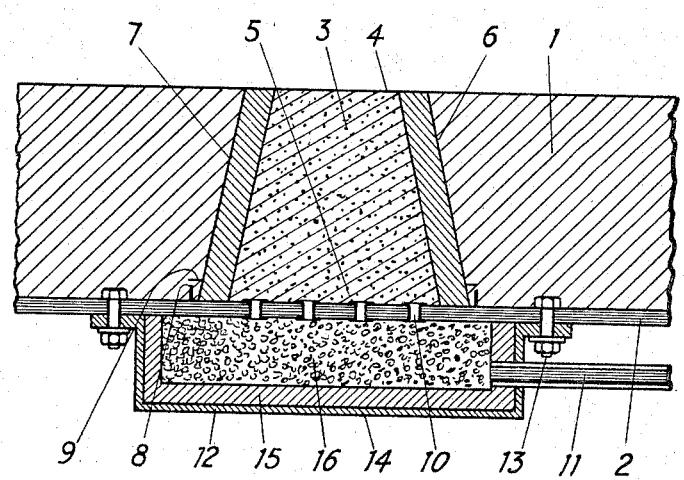

United States Patent Office 3,373,986
Patented Mar. 19, 1968

3,373,986
METALLURGICAL VESSEL WITH SAFETY
DEVICE
Etienne Spire, Westmound, Montreal, Quebec, Canada, assignor to L'Air Liquide, Societe Anonyme pour l'Etude et l'Exploitation des Procedes Georges Claude
Filed June 11, 1965, Ser. No. 463,176
Claims priority, application France, June 18, 1964, 978,778, Patent 1,407,225
5 Claims. (Cl. 266—39)

ABSTRACT OF THE DISCLOSURE

Under a porous plug 3 intended for insufflating a gas into molten metal is a blast box 12. Said box is filled with refractory material granules 16 which retain the molten metal in case it would leak through or around the plug. A metal plate with openings 10 may be located between the porous plug and the granules.

---

A certain number of metallurgical treatments are carried out by gas being blown into a liquid metal. Some of these treatments take place under atmospheric pressure; these are, for example, operations such as degasifying, mixing a molten metal either with various additives or with an active slag, or bubbling in gas with a view to modifying the metallographic structure of the treated metal after casting. Other operations, on the contrary, are effected under reduced pressure; this is the case for example with degasifying treatments in vacuo with bubbling of gas. One method of introducing the gas into the metal consists in using one or more porous refractory elements which are pervious to the gases but impervious to the liquid metals, said elements being disposed in the bottom or in the walls of the metallurgical vessel containing the metal to be treated.

Porous refractory elements of such a quality that they have a good cohesion and can be bonded fairly intimately with the refractory lining of the treatment vessel are known. Nevertheless, it may sometimes happen that a defect in the porous element or an insufficient cohesion leads to a perforation. Although such accidents are very rare, serious disadvantages nevertheless occur when they are produced and may cause serious deterioration of the installation.

The object of the invention is to overcome this disadvantage and to provide improvements in the arrangement for the flow of a fluid through a porous element.

To this end, the present invention relates to a safety device for blowing a gas into a vessel containing a molten metal, of which the bottom or the walls are provided with a porous refractory element which is pervious to gas and impervious to the liquid metal, characterized in that it comprises a gas introduction chamber filled with a gas-pervious refractory material, disposed below or alongside the said porous refractory element, of which it covers at least the entire surface opposite to that in contact with the liquid metal.

The present invention may in addition have one at least of the following features, in combination with the foregoing:

(a) The said chamber is separated from the porous refractory element by a metal plate comprising a plurality of holes;

(b) The refractory material filling the chamber is formed by granules of alumina;

(c) The walls of the said chamber are covered with a non-porous refractory lining.

It will easily be understood that the arrangement according to the invention guarantees a high safety in use when blowing a fluid into a vessel containing a molten metal. The porous element may actually wear in various ways. There is first of all the normal wear which can be easily foreseen after it has been in use for some time; the element is then replaced. Although this rarely happens, fissures can also be produced in the porous material, through which the metal rapidly flows and reaches the metal bottom of the vessel which is perforated.

It may also happen in exceptional cases that the wall of the porous element is not bonded as intimately to the refractory of the vessel as would be desirable; the connection zone offers a lower resistance, which is shown by an initiation of a rupture, through which the metal can suddenly surge and rapidly perforate the bottom of the vessel.

These accidents occur very infrequently but, in view of their serious nature, a safety device seems to be essential. The present invention makes it possible to eliminate any danger of sudden perforation in the case of gas being blown through the bottom or the walls of a ladle containing several tons of molten metal.

If there should be flow of liquid metal as a consequence of formation of fissures in the porous element, which metal quickly reaches the sheet metal bottom of the vessel, the latter is pierced very quickly; however, due to the provision of the chamber for the introduction of fluid and filled with a gas-pervious refractory product, the metal is retained and cooled in this chamber and is not able in any case to pierce its wall which is lined with impervious refractory cement.

If a rupture is produced in the zone connecting the porous element with the refractory material forming the bottom of the lining of the ladle, the metal pierces the metal bottom of the ladle but remains enclosed in the fluid introduction chamber, the dimensions of which are clearly larger than those of the porous element disposed above or alongside.

The passage of the gas under pressure through the sheet metal walls or bottom of the ladle is effected by means of a plurality of openings formed in that part of the bottom on which for example the porous element is resting. This arrangement permits a better distribution of the gas in the porous element and as a consequence in the liquid mass.

One embodiment of an arrangement according to the invention will now be described simply by way of non-limiting example and by reference to the accompanying single figure.

The reference 1 indicates the refractory lining of a bottom of a cast iron ladle bounded by the sheet metal wall 2. Formed in the lining 1 is the position for accommodating a porous element 3, the faces 4 and 5 of which are pervious to gas, while the impervious faces 6 and 7 are intimately bonded to the refractory lining 1. The porous element 3 is located on the bottom 2 in a centering ring 8, in which it is retained by means of a metalloplastic joint 9, the purpose of which is to facilitate the positioning of the porous element.

That part of the bottom wall 2 on which the element 3 is resting comprises a plurality of openings 10 which permit the passage of a stream of nitrogen under pressure coming from the conduit 11. An introduction chamber 12 fixed on the bottom wall 2 by means of bolts 13 comprises a sheet metal casing 14, a lining of refractory cement 15 and a porous filling 16 formed of alumina granules generally spheroidal in shape permitting the passage of the stream of nitrogen under pressure; the granules can be hollow and consist of, for example, bubble alumina.

It will also be possible to provide for a means for measuring the temperature to be embedded in the filling 16, for example a thermoelectric couple, so as to be advised of any premature leakage of molten metal through or along the porous plug.

It is quite obvious that the embodiment of the invention, which has been set forth above, is not limiting in any way and that it would certainly be possible to visualize modifications and improvements as regards details without thereby departing from the scope of the present invention.

What I claim is:

1. A vessel adapted to contain molten metal, said vessel comprising an outer metal wall with a refractory lining, an element disposed in said refractory lining of said vessel, said element being pervious to gas and impervious to said molten metal whereby gas may pass through said element to the interior of said vessel, a safety device comprising a blast box defining a chamber on the outside of said wall and covering the outer surface of said element, said metal wall being open to the passage of gas from said chamber to said element, a gas-pervious loosely packed granular inorganic refractory material in said chamber outside said wall, and means for introducing a gas from outside the chamber into said chamber and thence through said element and into the interior of said vessel.

2. A vessel as claimed in claim 1, said refractory material being alumina.

3. A vessel as claimed in claim 1, and a perforated metal plate separating said element from said refractory material.

4. A vessel as claimed in claim 1, said refractory material consisting of small hollow spheroidal bodies.

5. A vessel as claimed in claim 1, and an impervious lining of refractory material in said blast box.

References Cited

UNITED STATES PATENTS

| | | | |
|---|---|---|---|
| 2,947,527 | 8/1960 | Spire | 266—34 |
| 3,053,525 | 9/1962 | Leroy et al. | 266—34 |
| 3,128,324 | 4/1964 | Spolders et al. | 266—34 X |

FOREIGN PATENTS 919,266  3/1947  France.

J. SPENCER OVERHOLSER, *Primary Examiner.*

E. MAR, *Assistant Examiner.*